United States Patent [19]

Emura

[11] Patent Number: 5,615,036
[45] Date of Patent: Mar. 25, 1997

[54] OPTICAL NETWORK COMPRISING NODE GROUPS AND AN ANALOG REPEATER NODE UNIT BETWEEN TWO NODE GROUPS

[75] Inventor: Katsumi Emura, Tokyo, Japan

[73] Assignee: NEC Corporation, Japan

[21] Appl. No.: 635,011

[22] Filed: Apr. 19, 1996

Related U.S. Application Data

[63] Continuation of Ser. No. 448,658, May 24, 1995, abandoned.

[30] Foreign Application Priority Data

May 27, 1994 [JP] Japan .................................. 6-115499

[51] Int. Cl.⁶ .................................................. H04J 14/02
[52] U.S. Cl. ......................... 359/124; 359/118; 359/125; 359/174
[58] Field of Search .......................... 359/118, 120–121, 359/125, 124, 127, 174, 178

[56] References Cited

U.S. PATENT DOCUMENTS

| | | | |
|---|---|---|---|
| 5,189,414 | 2/1993 | Tawara .................................. | 370/94.3 |
| 5,210,632 | 5/1993 | Murakami et al. ...................... | 359/178 |

FOREIGN PATENT DOCUMENTS

| | | | |
|---|---|---|---|
| 0249056 | 12/1987 | European Pat. Off. .............. | 359/121 |
| 2224901 | 5/1990 | United Kingdom .................... | 359/120 |
| 2227623 | 8/1990 | United Kingdom .................... | 359/121 |

OTHER PUBLICATIONS

T. Shiozawa, et al., "U–FDMA/D–TDM Optical Fiber Multiaccess Subscriber Transmission System", Electronics, Information, and Communication System Study Group of the Institute of Electronics, Information and Communication Engineers, CS 92–6 (May 28, 1992), pp. 33–38.

T. Shiozawa, et al., "Upstream–FDMA/Downstream–TDM Optical Fiber Multiaccess Network", IEEE International Conference on Communications, Jun. 14–18, 1992, pp. 304.7.1 (0105) to 304.7.5 (0109).

*Primary Examiner*—Wellington Chin
*Assistant Examiner*—Kinfe-Michael Negash
*Attorney, Agent, or Firm*—Ostrolenk, Faber, Gerb & Soffen, LLP

[57] ABSTRACT

In an optical network comprising terminator nodes (15(A1) etc) assigned with frequency bands for transmitting transmission signals subcarrier-frequency multiplexed on optical signals of a predetermined number of optical wavelengths from one node to at least another, the nodes are grouped into terminator node groups (11(A, B, C)), each assigned with selected wavelengths among the optical wavelengths except a specific wavelength specific thereto. One node group (11(A)) transmits outgoing signals of the selected wavelengths to an analog repeater node (17(A)) for supplying ingoing signals of the specific wavelength to a common optical coupler (13). Supplied as outcoming signals of various wavelengths with such outgoing signals of other node groups (11(B, C)) directed to the coupler, the repeater node supplies the one node group with incoming signals of the specific wavelength. Preferably, the repeater node comprises a photodetector detecting as send-in (receive-in) signals the transmission signals carried on the outgoing (outcoming) signals, bandbass filters for filtering the send-in (receive-in) signals into intermediate signals, frequency converters for the intermediate signals to produce send-out (receive-out) signals according to a demand assign scheme, and a light source producing the ingoing (incoming) signals carrying the send-out (receive-out) signals.

30 Claims, 4 Drawing Sheets

OPTICAL NETWORK COMPRISING NODE GROUPS AND AN ANALOG REPEATER NODE UNIT BETWEEN TWO NODE GROUPS

This is a continuation of application Ser. No. 08/448,658 filed May 24, 1995 now abandoned.

BACKGROUND OF THE INVENTION:

This invention relates to an optical network operable as a subcarrier-frequency multiplexed system and to an analog repeater node for use in the optical network.

Optical communication has hitherto been developed on a basis of digital synchronization hierarchy (SDH). Optical networks have therefore been studied on the basis of the SDH. A salient feature of the SDH is to provide for unified dealing with all information, such as telephone information and data information. In order to unify such services, developments are in progress towards BISDN's (broadband integrated services digital networks). As a consequence, it is usual to design an optical network with attention directed to digital multiplexing based on the SDH.

In the meanwhile, use of the optical communication has widely spread to various applications. Typical are applications in cable television and in mobile communications. In these applications, transmission signals may be analog signals. Such signals are transmitted by frequency multiplexing into frequency multiplexed signals. In the optical networks, it is often desirable to propagate these signals through optical fibers as they are. It is therefore advantageous to use subcarrier-frequency multiplexed optical communication wherein the frequency multiplexed signals are propagated as they stand.

This subcarrier-frequency multiplexed optical communication does not necessarily well match with conventional SDH. It is consequently important with progresses in applications of the subcarrier-frequency multiplexed optical communication to establish an optical network on a large scale on the basis of the subcarrier-frequency multiplexing.

An excellent optical network is disclosed in an article contributed in the Japanese language by Takehiro Shiozawa and Makoto Shibutani to the transactions of an Electronics, Information, and Communication System Study Group of the Institute of Electronics, Information and Communication Engineers, CS 92-6 (May 28, 1992), pages 33 to 38, under the title of "U-FDMA/D-TDM Optical Fiber Multiaccess Subscriber Transmission System". A similar optical network is revealed by Takahiro Shiozawa and two others in the IEEE International Conference on Communications, Jun. 14–18, 1992, pages 304.7.1 (0105) to 304.7.5 (0109), under the title of "Upstream-FDMA/down-stream-TDM Optical Fiber Multiaccess Network".

Such a Shiozawa et al optical network comprises a plurality of terminator nodes connected to a central office through at least one star coupler. Each terminator node comprises several network terminals.

For upward or upstream transmission towards the central office, the network terminals of each terminator node are assigned with discrete signal frequencies. In each terminator node, transmission signals of the discrete signal frequencies are multiplexed into a frequency multiplexed signal. Each terminator node is assigned with an individual optical wavelength as an assigned wavelength and sends to the star coupler the frequency multiplexed signal on an optical signal of the assigned wavelength.

For downward or downstream transmission from the central office, the network terminals of the Shiozawa et al optical network are assigned with respective time slots to enable use of a time division multiplexing (TDM) technique. Although the TDM technique is preferred according to Shiozawa et al, it is possible to use a wavelength division multiplexing (WDM) technique also for the downstream transmission.

On establishing an optical network based on subcarrier-frequency multiplexing, each terminator node can independently transmit the transmission signals on optical signals if the terminator nodes are assigned signal frequency bands which do not interfere with one another. Even in this event, a problem may arise from optical interference noise when such optical signals are transmitted simultaneously from a plurality of terminator nodes. This problem of optical beat interference noise is pointed out by Shiozawa et al and is removed by Shiozawa et al with use of different optical wavelengths in the terminator nodes, respectively. It is, however, impossible to establish the optical network on a large scale if such discrete frequencies and different optical wavelengths must be used individually in the terminator nodes of the optical network.

SUMMARY OF THE INVENTION

It is an object of the present invention to provide an optical network which can be established on a large scale and is operable in accordance with subcarrier-frequency multiplexing.

It is another object of this invention to provide an optical network which is of the type described and is used to transmit transmission signals of a plurality of signal frequency bands on optical signals of a predetermined number of optical wavelengths and in which neither the frequency bands nor the optical wavelengths give rise to beat interference noise.

It is still another object of this invention to provide an optical network which is of the type described and comprises a plurality of terminator nodes grouped into a plurality of terminator node groups and an analog repeater node unit between two of the terminator node groups and in which the analog repeater node behaves like one of the terminator nodes.

It is yet another object of this invention to provide an analog repeater node unit for use in the optical network of the type described.

Other objects of this invention will become clear as the description proceeds.

In accordance with an aspect of this invention, there is provided an optical network comprising a plurality of terminator nodes assigned with frequency bands for transmitting transmission signals on optical signals having a predetermined number of optical wavelengths, wherein: (A) the terminator nodes are grouped into a plurality of terminator node groups with each of the terminator node groups assigned with selected wavelengths to produce outgoing signals having the selected wavelengths among the optical signals for others of the terminator node groups, these selected wavelengths being selected from the optical wavelengths excluding one of the optical wavelengths that is specific to each of the above-mentioned terminator node groups as a specific wavelength; (B) one node group and other node groups of the terminator node groups being connected through an analog repeater node unit for receiving at least a part of the outgoing signals of the above-mentioned one node group as send-in signals for repeating the send-in signals as send-out signals to transmit the send-out signals as incoming signals of the optical signals t6 the other node groups.

In accordance with a different aspect of this invention, there is provided an analog repeater node for use in an optical network comprising a plurality of terminator nodes assigned with frequency bands for transmitting transmission signals on optical signals having a predetermined number of optical wavelengths, with the terminator nodes grouped into a plurality of terminator node groups and with each of the terminator node groups assigned with selected wavelengths to produce outgoing signals having the selected wavelengths among the optical signals for others of the terminator node groups, these selected wavelengths being selected from the optical wavelengths excluding one of the optical wavelengths that is specific to the above-mentioned each of terminator node groups as a specific wavelength, wherein the analog repeater node unit interconnects any one node group of the terminator node groups and a common optical coupler common to other node groups of the terminator node groups other than the one node group and is responsive to the outgoing signals of the one node group for delivering at least a part of the outgoing signals as ingoing signals to the common optical coupler.

DESCRIPTION OF THE PREFERRED EMBODIMENTS

Figure 1:
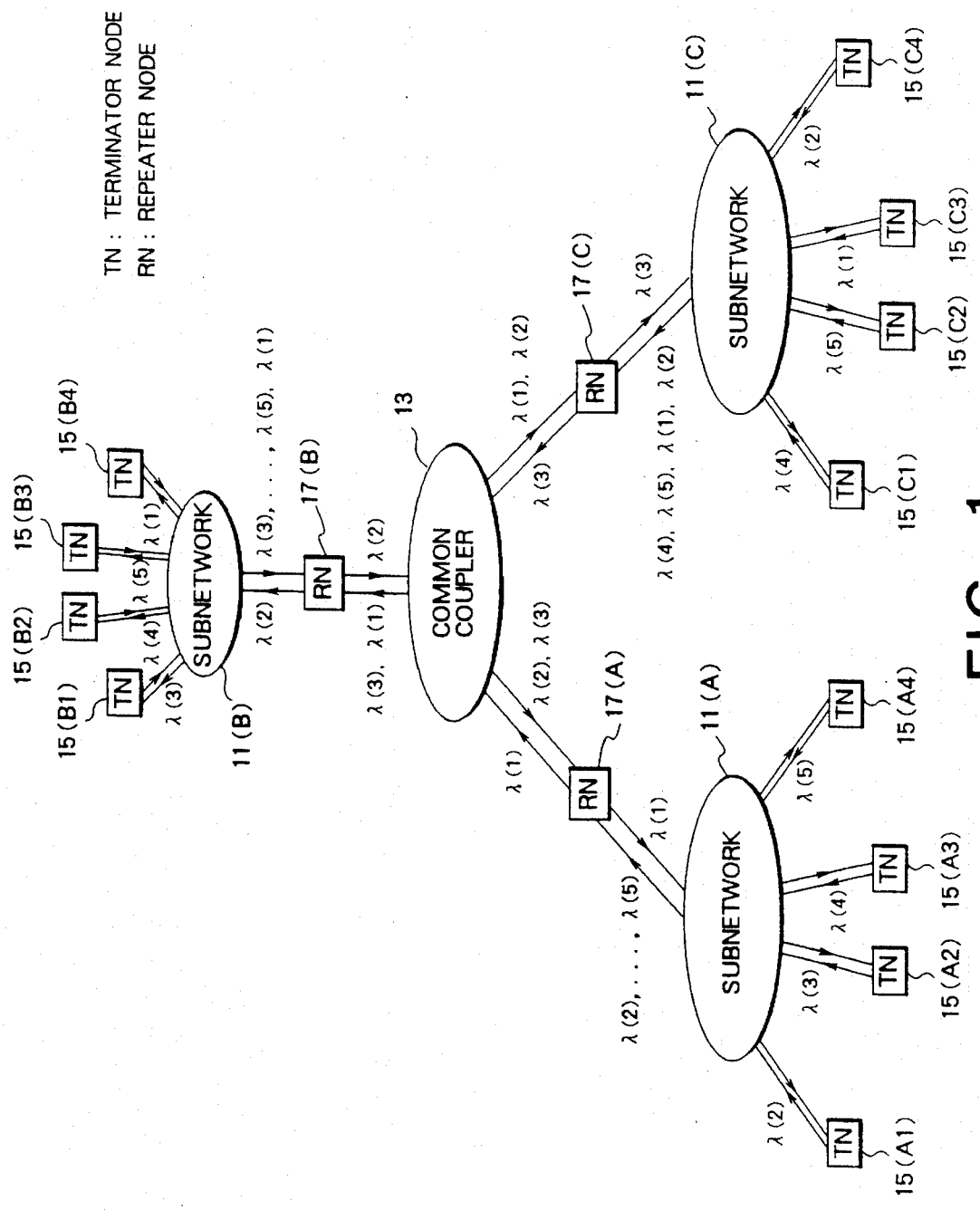
FIG. 1 is a block diagram of an optical network according to a first embodiment of the present invention.

Referring to FIG. 1, an optical network is shown according to a first embodiment of the present invention. The optical network comprises first through third subnetworks 11(A), 11(B), and 11(C), each of which is an optical coupler and typically comprises a star coupler.

In the example illustrated, the first through the third subnetworks 11 (suffixes A to C omitted) are connected to one another through a common coupler 13 in a manner which will be described in more detail. The first subnetwork 11(A), is connected to first through fourth terminator nodes 15(A1), 15(A2), 15(A3), and 15(A4) which will be either collectively or individually designated by a simpler reference symbol 15(A). The first subnetwork 11(A) and the first through the fourth terminator nodes 15(A) connected thereto will collectively be called a first terminator node group and will be designated by the reference symbol 11(A) of the first subnetwork.

First through fourth terminator nodes 15(B1), 15(B2), 15(B3), and 15(B4) or 15(B) are connected to the second subnetwork 11(B). First through fourth terminator nodes 15(C1), 15(C2), 15(C3), and 15(C4) or 15(C) are connected to the third subnetwork 11(C). Combinations of these terminator nodes 15(B) and 15(C) and the second and the third subnetworks 11(B) and 11(C) are called second and third terminator node groups 11(B) and 11(C).

In each of the terminator node groups 11, the terminator nodes 15(A), 15(B), and 15(C) or 15 are individually assigned with first through fifth wavelengths $\lambda(1)$, $\lambda(2)$, $\lambda(3)$, $\lambda(4)$, and $\lambda(5)$ of a predetermined number, such as five, of optical wavelengths. More particularly in the illustrated example, the first terminator node group 11(A) is assigned with primary selected wavelengths of the second through the fifth wavelengths selected from the first through the fifth wavelengths excluding one of the optical wavelengths that is specific to the first terminator node group 11(A) as a first specific wavelength $\lambda(1)$. In this manner, the second terminator node group 11(B) is assigned with secondary selected wavelengths of the third through the fifth wavelengths and the first wavelength and with a second specific wavelength $\lambda(2)$. The third terminator node group 11(C) is assigned with ternary selected wavelengths of the fourth and the fifth wavelengths and the first and the second wavelengths and with a third specific wavelength $\lambda(3)$.

Moreover, the terminator nodes 15 of the optical network, namely, of the first through the third terminator node groups 11 are assigned with signal frequency bands in the manner which will be described. More particularly, the terminator nodes 11 produce optical signals with the optical wavelengths assigned thereto, respectively. The signal frequency bands are assigned to source nodes of the terminator nodes 11 for use in transmitting transmission signals on the optical signals to destination nodes, respectively, of the terminator nodes 11.

The destination nodes may be the terminator nodes 15(A), 15(B), or 15(C) of one of the terminator node groups 11 that comprises the source nodes. Alternatively, the destination nodes may be in at least one of the terminator node groups 11 that is other than the above-mentioned one of the terminator node groups 11. In this latter event, the first terminator node group 11(A) produces primary outgoing or outwardly directed signals having the primary selected wavelengths among the optical signals towards at least one of the terminator nodes 15(B) and 15(C) of the second and the third terminator node groups 11(B) and 11(C). This applies to the second and the third terminator node groups 11(B) and 11(C).

Between the first subnetwork 11(A) and the common coupler 13, interposed is a first analog repeater node 17(A). Similarly, use is made of second and third analog repeater nodes 17(B) and 17(C). In each of the analog repeater nodes 17 (suffixes A, B, and C omitted), a send-in and send-out part receives as send-in signals the transmission signals carried on the outgoing signals sent from a pertinent one of the terminator node groups 11 that is connected thereto. The send-in and send-out part repeats the send-in signals as send-out signals. The send-in and send-out part sends the send-out signals to the common coupler 13 carried on ingoing signals of the specific wavelength of the pertinent one of the terminator node groups 11.

In each of the analog repeater nodes 17, a receive-in and receive-out part is connected to the pertinent one of terminator node groups 11 and receives, as receive-in signals, the transmission signals carried on outcoming signals delivered thereto from the common coupler 13 and produced for delivery to the common coupler 13 from other ones of the terminator node groups 11 that are other than the pertinent one of the terminator node groups 11. The outcoming signals have the specific wavelengths specific to the other ones of the terminator node groups. Like the send-in and send-out part, the receive-in and receive-out part repeats the receive-in signals as receive-out signals. The receive-out signals are delivered to the pertinent one of the terminator node groups 11 carried on incoming signals of the specific wavelength specific to the pertinent one of terminator node groups 11.

A combination of each of the analog repeater nodes 17, the common coupler 13, and others of the analog repeater nodes 17 is herein called an analog repeater node unit (13, 17). The common coupler 13 may alternatively be referred to either as a repeater subnetwork or a common subnetwork and be designated by the reference numeral 13. The five optical wavelengths are typically 1.53, 1.54, 1.55, 1.56, and 1.57 micrometers and are different in this manner from one another so as to avoid occurrence of optical interference in each of the subnetworks 11 and 13. Use of the analog repeater node unit (13, 17) makes it possible to reuse the five optical wavelengths in the first through the third terminator node groups 11 provided that such terminator node groups 11 are not greater in number than the predetermined number and that the terminator nodes 15(A), 15(B), or 15(C) are not greater in number in each of the terminator node groups 11 than the predetermined number less one, namely, the primary or similar selected wavelengths.

In each terminator node group 11, the first through the fourth terminator nodes 15(A), 15(B), or 15(C) receive as intragroup terminator nodes the transmission signals sent thereto on the optical signals of the selected wavelengths from others of the intragroup terminator nodes and as extragroup terminator nodes the transmission signals sent thereto through a relevant one of the analog repeater nodes 17 as the incoming signals of the selected wavelength. Each of the terminator nodes 15 of the optical network can therefore receive the transmission signals arriving thereat on the optical signals of the predetermined number of wavelengths. Carrying the transmission signals as frequency multiplexed signals, the optical signals are propagated in the optical network through bidirectional optical fibers between each of the first through the third subnetworks 11 and the intragroup terminator nodes, between the subnetworks 11 and the analog repeater nodes 17, and between the analog repeater nodes 17 and the common coupler 13.

Figure 2:
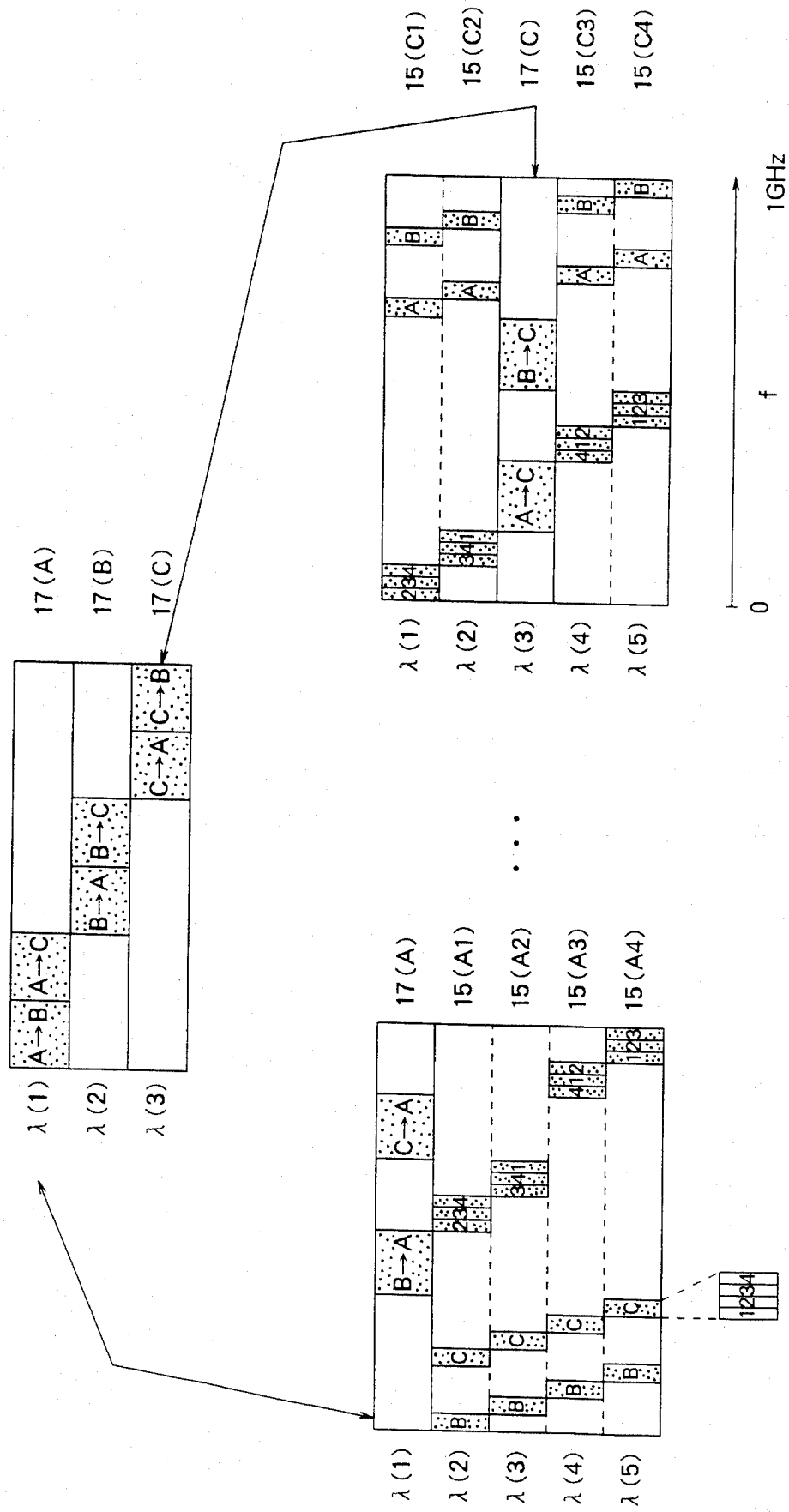
FIG. 2 exemplifies frequency allocations for transmission signals transmitted in the optical network illustrated in FIG. 1.

Turning to FIG. 2 and FIG. 1 continuously referred to, the signal frequency bands are assigned to the terminator nodes 15 of the terminator node groups 11 and to the analog repeater nodes 17 of the optical network as indicated with dots printed in each area of frequency allocations. Only the frequency allocations to the first and the third terminator node groups 11(A) and 11(C) are depicted together with the frequency allocations to the transmission signals carried on the incoming signals reaching the first and the third terminator node groups 11(A) and 11(C) in the lower left and right blocks. The frequency allocation to the analog repeater nodes 17 is illustrated in an upper middle block for the ingoing signals which are derived from the primary through the ternary outgoing signals.

An overall frequency band of the signal frequency bands may be 1 GHz wide as indicated by f. For each of the lower left and right and the upper middle blocks, the optical wavelengths are indicated on a left side. The terminator nodes 15(A) and 15(C) and the analog repeater nodes 17 are indicated on a right side.

In the first terminator node group 11(A), the first terminator node 15(A1) is assigned with a frequency band portion which is indicated by a label "B" for the transmission signals sent on the optical signals of the second wavelength as the outgoing signals directed to the terminator nodes 15(B) of the second terminator node group 11(B). Another frequency band portion is assigned to the first terminator node 15(A1) as labelled "C" for the transmission signals sent on the optical signals of the second wavelength as the outgoing signal directed to the terminator nodes 15(C) of the third terminator node group 11(C). Collectively as still another frequency band portion, discrete frequencies are assigned to the first terminator node 15(A1) as indicated with labels "2", "3", and "4" for the transmission signals carried on the optical signals of the second wavelength for delivery through the first subnetwork 11(A) to others 15(A2), 15(A3), and 15(A4) of the first terminator node group 15(A). Each of the areas "B" and "C" are of a frequency band which is narrower than a total depicted in detail for the terminator nodes 15(C) of the third terminator node group 11(C).

In the first terminator node group 11(A), the second through the fourth terminator nodes 15(A2) to 15(A4) are similarly assigned with the signal frequency bands, respectively. The discrete frequencies of the third terminator nodes 15(A3) are spaced apart from those of the second terminator node 15(A2) by a frequency interval. A like frequency interval is left between the frequency band portion assigned to the fourth terminator node 15(A4) to the transmission signals sent as the outgoing signals to the third terminator node group 11(C) and the discrete frequencies assigned to the first terminator node 15(A1) and labelled "2", "3", and "4" as described above.

For the first terminator group 11(A), such frequency intervals are assigned to the first analog repeater node 17(A) as indicated by legends "B→A" and "C→A" collectively as a signal frequency band for the transmission signals carried on the incoming signals which have the first wavelength and reach the first terminator node group 11(A) through the first analog repeater node 17(A). A frequency band portion of the legend "C >A" is sent from the third terminator node group 11(C) on its outgoing signals in the manner which is described in the following.

In the third terminator group 11(C), the first terminator node 15(C1) is assigned with discrete frequencies labelled "2", "3", and "4" for the transmission signals which are directed to the second through the fourth terminator nodes 15(C2) to 15(C4) and are carried on the optical signals of the first wavelength. As indicated by a label "A", a frequency band portion is assigned to the first terminator node 15(C1) for the transmission signals which are carried by the outgoing signals having the first wavelength and directed to the first terminator node group 11(A). Self explanatory will be another frequency band portion labelled "B" and a signal frequency band assigned to the second terminator node 15(C2).

For the third terminator node group 11(C), the third analog repeater node 17(C) is assigned with a frequency band which consists of frequency intervals indicated by legends "A→C" and "B →C" for the transmission signals carried by the incoming signals of the third wavelength and sent to the third analog repeater node 17(C) from the common coupler 13. The transmission signals of a frequency band portion of the legend "A→C" result from the outgoing signals which issue from the first terminator node group 11(A) in the manner described above.

For the first analog repeater node 17(A) as described in the upper middle block, a frequency band is assigned as indicated by legends "A→B" and "A→C" to the transmission signals carried on the ingoing signals which are produced with the first wavelength and are derived from the outgoing signals produced with the second through the fifth wavelengths by the first through the fourth terminator nodes 15(A) of the first terminator node group 11(A) as described before. Frequency bands are similarly assigned to the second and the third analog repeater nodes 17(B) and 17(C) for the transmission signals carried on the ingoing signals.

In the manner described in the foregoing, the overall frequency band is wholly assigned as the signal frequency bands in each of the first through the third terminator node groups 11 including the incoming signals supplied to the terminator node group 11(A), 11(B), or 11(C) and in a combination of the analog repeater nodes 17 for their ingoing signals supplied to the common coupler 13. Use of such different signal frequency bands at the intragroup terminator nodes of each terminator node group makes it possible in combination with reuse of the optical wavelengths to reuse the frequency bands of a predetermined overall frequency band in the terminator nodes 15 of the optical network and in the analog repeater nodes 17 and to avoid interferences between the transmission signals directed from each of the terminator nodes 15 and the analog repeater nodes 17 to others of the terminator nodes 15. It is now understood that each of the first and like analog repeater node units (13, 17) serves as a terminator node in the optical network at one of the terminator node groups that receives the incoming signals.

Attention should be directed in connection with the above to the fact that the transmission signals are directed from each source node only partly to the destination node or nodes. Such a part is readily selected by filtering the send-in signals in the send-in and send-out part of each analog repeater node 17.

Figure 3:
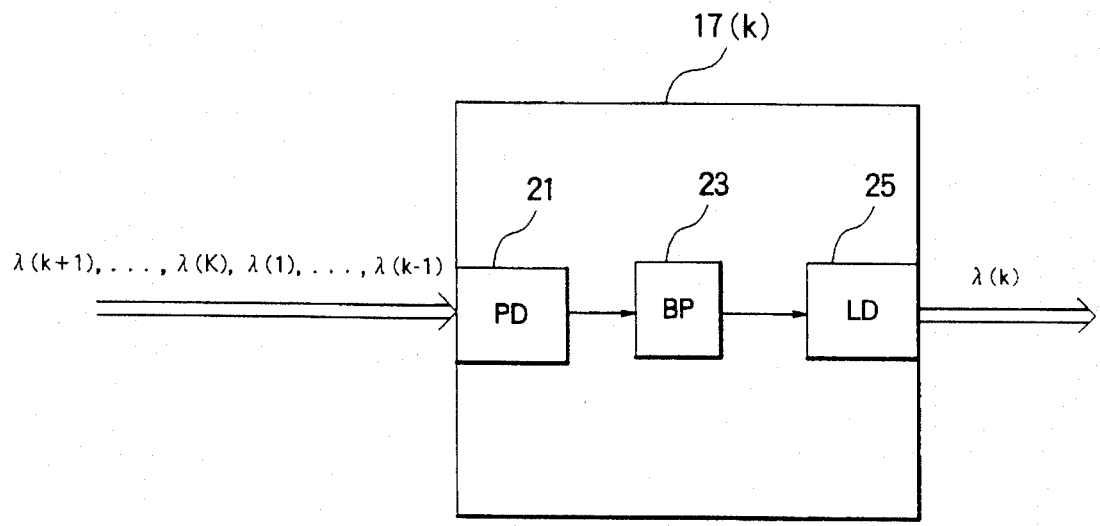
FIG. 3 a partial block diagram of an analog repeater node unit for use in the optical network depicted in FIG. 1.

Turning now to FIG. 3 with FIG. 1 further continuously referred to, it is presumed that the optical network comprises first through K-th terminator node groups 11(1), 11(2), . . . , and 11(K), where K represents a predetermined integer. The optical wavelengths are K in total. A k-th terminator node group 11(k) is assigned with a k-th optical wavelength $\lambda(k)$ as the k-th specific wavelength and is connected to the common coupler 13 through a k-th analog repeater node 17(k), where k is variable between 1 and K, both inclusive. In the k-th terminator node group 11(k), first through (K−1)-th terminator nodes 15(1), . . . , and 15(K−1) are assigned with different signal frequency bands and with the first through the K-th optical wavelengths except for the k-th optical wavelength. The k-th terminator node group 11(k) therefore receives the incoming signals of the k-th optical wavelength from the analog repeater node 17(k) and supplies the k-th analog repeater nodes 17(k) with k-ary outgoing signals having, as k-ary selected wavelengths, (k+1)-th through the K-th and the first through (k−1)-th optical wavelengths $\lambda(k+1)$, . . . , and $\lambda(K)$ and $\lambda(1)$, . . . , and $\lambda(k-1)$.

In the k-th analog repeater node 17(k), the send-in and send-out part comprises a photodetector (PD) 21 supplied from the k-th terminator node group 11(k) with the k-ary outgoing signals indicated in FIG. 3 by the (k+1)-th through the K-th and the first through the (k−1)-th optical wavelengths. The photodetector 21 delivers the send-in signals to a bandpass filter (BP) 23 for filtering at least a part of the send-in signals into the send-out signals in accordance with the signal frequency bands of the transmission signals carried by the k-ary outgoing signals and consequently by the send-in signals to produce a frequency-multiplexed signal of the send-out signals. The bandpass filter 23 delivers the send-out signals to a light source or laser diode (LD) 25 which generates an oscillation signal of the k-th optical wavelength. At the light source 25, the send-out signals are carried on the oscillation signal. The light source 25 thereby produces as ingoing signals the optical signals carrying the send-out signals.

In this manner, the send-in and send-out part is connected to the common coupler 13 and to a pertinent terminator node group 11(k) of the terminator node groups 11 to receive the outgoing signals as send-in signals of the optical signals. The send-in and send-out part repeats at least a part of the send-in signals as the send-out signals, which are sent to the common coupler 13 as the ingoing signals of the optical signals. The outgoing signals have the selected wavelengths, namely, the (k+1)-th through the K-th and the first through the (k−1)-th wavelengths. The ingoing signals have the specific or the k-th wavelength.

In the k-th analog repeater node 17(k), a receive-in and receive-out part is supplied from the common coupler 13 with the outcoming signals. Excluding the k-th terminator node group 11(k), the terminator node groups 11 of the optical circuit are called other node groups 11(k'), where k' represents (k+1) through K and 1 through (k−1). With regard to each of the other node groups 11(k'), the selected wavelengths will be called preselected wavelengths. The specific wavelength will be called a particular wavelength. Excluding the k-th analog repeater node 17(k), the analog repeater nodes 17 of the optical network will be called other repeater nodes 17(k'), which supply the common network 13 with their ingoing signals with the particular wavelengths of the (k+1)-th through the K-th and the first through the (k−1)-th wavelengths. The outgoing signals are the ingoing signals produced by the other repeater nodes 17(k') with the particular wavelengths and are propagated through the common coupler 13.

In FIG. 3, the receive-in and receive-out part is not different in structure and operation from the send-in and send-out part and comprises the photodetector 21, the bandpass filter 23, and the light source 25. In contrast to the photodetector 21 and the light source 23 of the send-in and send-out part which are connected to the k-th terminator node group 11(k) and to the common coupler 13, the photodetector 21 and the light source 23 of the receive-in and receive-out part are connected to the common coupler 13 and to the k-th terminator node group 11(k). As receive-out signals, the light source 23 supplies the outcoming signals of the k-th optical wavelength to the k-th terminator node group 11(k).

Use of the bandpass filter 23 in the send-in and send-out part results in effective use of the signal frequency bands. This applies to use of the bandpass filter 23 in the receive-in and receive-out part.

Referring afresh to FIG. 4 and again to FIG. 1, the description will proceed to an optical network according to a second embodiment of this invention. This optical network is not different in structure from that illustrated with reference to FIG. 1. The first through the fifth optical wavelengths are used as before. In contrast to fixed frequency allocations to the terminator nodes 15 in the manner described in conjunction with FIG. 2, a demand assign scheme is used in assigning the signal frequency bands to the terminator nodes 15 of the optical network. This increases an amount of information propagated through the optical network.

Figure 4:
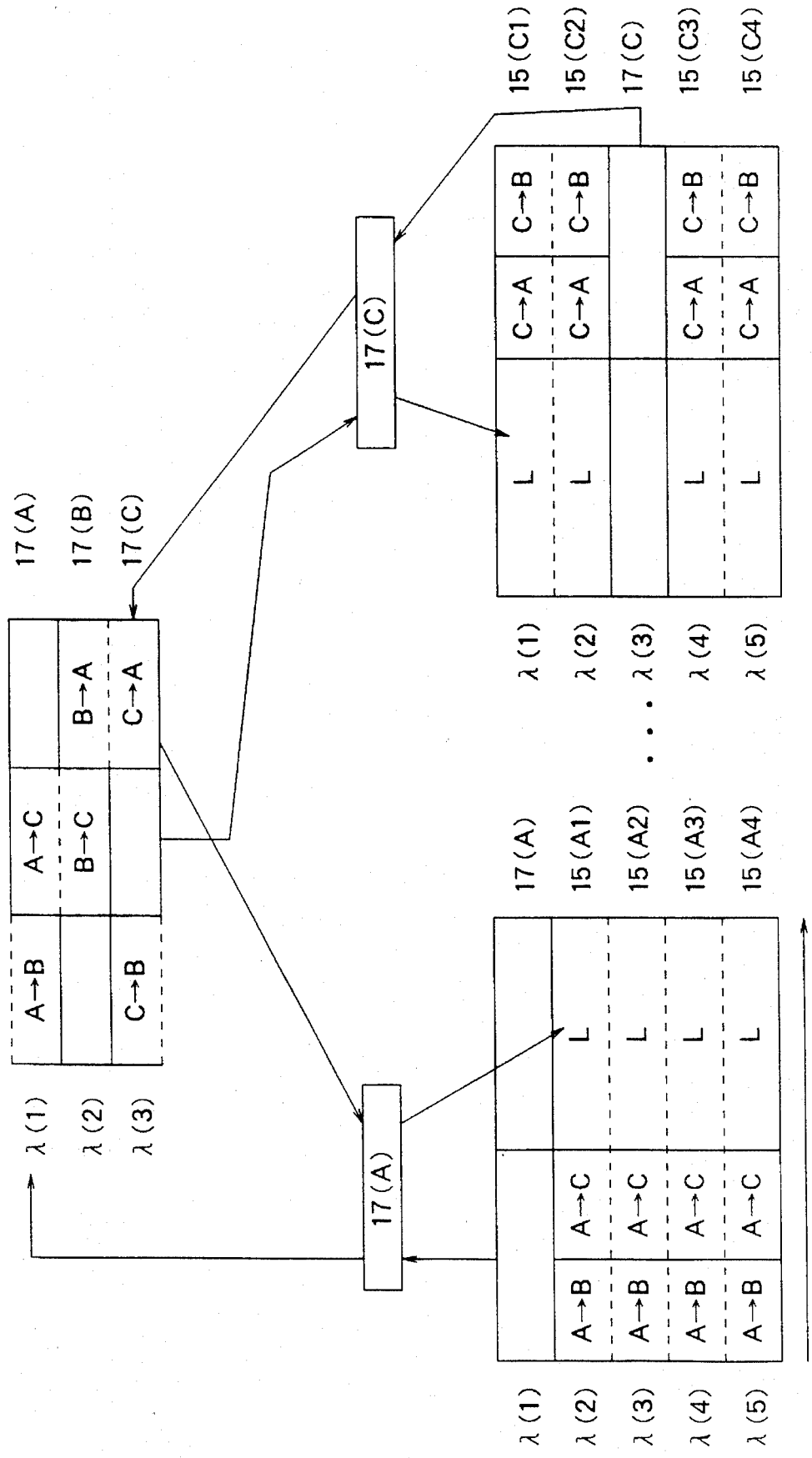
FIG. 4 exemplifies frequency allocations for transmission signals transmitted in an optical network according to a second embodiment of the present invention.

In FIG. 4, the frequency allocations to the first and the third terminator node groups 11(A) and 11(C), to the receive-in and receive-out parts of the analog repeater nodes 17(A) and 17(C), and to the send-in and send-out parts of the analog repeater nodes 17 of the optical network are depicted in the blocks positioned like those in FIG. 2. In each block, the first terminator node 15(A1) of the first terminator node group 11(A), other terminator nodes, the first analog repeater node 17(A), and other analog repeater nodes are assigned with an overall frequency band f which may be narrower than 1 GHz wide.

For each of the analog repeater nodes 17 of the optical network, the overall frequency band is substantially equally into a lowest, a middle, and a highest frequency band. For the terminator nodes 15(A), the overall frequency band is divided into narrower lowest and middle frequency bands and a broader highest frequency band. For the terminator nodes 15(C), the overall frequency band is divided into a broader lowest frequency band and narrower middle and highest frequency bands. The broader frequency band is substantially twice as wide as each of the narrower frequency bands. The expression "frequency bands" is herein used merely for convenience instead of the expression "frequency band portion" used in conjunction with FIG. 2.

In the lower left block, the terminator nodes 15(A) are assigned with pertinent ones of the primary selected wavelengths of the second through the fifth optical wavelengths and with the narrower lowest frequency band in common for use in transmitting, if any, the transmission signals directed as the primary outgoing signals towards the terminator nodes 15(B) as indicated by a legend "A→B". In the manner indicated by another legend "A-C" the narrower middle frequency band is for use in transmitting, if any, the transmission signals directed from the first terminator node group 11(A) as the primary outgoing signals towards the terminator nodes 15(C).

As indicated by a label "L", the broader highest frequency band is for use in transmitting, if any, the transmission signals which are either from each of the terminator nodes 15(A) locally to at least one of other terminator nodes of the first terminator node group 11(A) or as the incoming signals of the first optical wavelength from the first analog repeater node 17(A) to at least one of these other terminator nodes. Before sent from the first analog repeater node 17(A) as the incoming signals, the outcoming signals are supplied from the common coupler 13 to the first analog repeater node 17(A) as the receive-in signals with the receive-in signals frequency converted in the manner which will presently be described and is indicated by a line drawn from the upper middle block (a bottom side near the right end) to the areas labelled "L" with a rectangle interposed with a label "17(A)".

In the lower right block, the terminator nodes 15(C) are assigned with pertinent ones of the ternary selected wavelengths, namely, with the optical wavelengths except for the third optical wavelength used as the third specific wavelength for the incoming signals reaching the third terminator node group 11(C) from the third analog repeater node 17(C). Indicated by the label "L", the broader lowest frequency band is assigned to the terminator nodes 15(C) in the manner described above as regards the broader highest frequency band depicted in the lower left block. Indicated by legends "C→A" and "C→B", the narrower middle and highest frequency bands are used in transmitting, if any, the ternary outgoing signals produced at the third terminator node group 11(C) and directed towards the first and the second terminator node groups 11(A) and 11(B).

In the upper middle block, the first analog repeater node 17(A) is assigned with the lowest and the middle frequency bands with the legends "A→B" and "A→C" for use in supplying the common coupler 13 and the ingoing signals directed from the first terminator node group 11(A) with the first optical wavelength towards the second and the third terminator node groups 11(B) and 11(C). For use in producing these ingoing signals, the primary outgoing signals are delivered from the first terminator node group 11(A) to the first analog repeater node 17(A) as the send-in signals in the manner depicted by a line drawn upwardly from the lower left block to the right-hand side of the upper middle block near its top. The send-in signals have the frequency bands of the areas indicated by the legends "A→B" and "A→C" for the primary outgoing signals. These frequency bands are frequency converted in the first analog repeater node 17(A) into the frequency bands with the legends "A→B" and "A→C" for the ingoing signals in the manner which is depicted by the above-described rectangle with the label "17(A)" interposed in the upwardly drawn line and which will shortly be described.

The third analog repeater node 17(C) is assigned with the lowest and the highest frequency bands which are indicated by the legends "C→B" and "C→A" for the ingoing signals delivered to the common coupler 13 for further delivery towards the second and the first terminator node groups 11(B) and 11(A). In producing these ingoing signals, the send-in signals of the middle frequency band are frequency converted into the broader lowest frequency band in the third analog repeater node 17(C) as depicted by a rectangle with the label "17(C)" in a line drawn from the middle frequency band to the broader lowest frequency band and as will presently become clear. On supplying the ternary outgoing signals to the third analog repeater node 17(C), the send-in signals to the narrow middle and highest frequency bands are frequency converted into the lowest and the highest frequency bands as depicted by the rectangle with the label "17(C)" interposed in another line drawn from the lower right block to the upper middle block (a right-hand side near the bottom) and as will shortly become clear.

In the upper middle block, aligned along a leftmost column are the ingoing signals directed from the first and the third analog repeater nodes 17(A) and 17(C) towards the second terminator node group 11(B). This applies to the ingoing signals directed from the first and the second analog repeater nodes 17(A) and 17(B) to the third terminator node group 11(C) and also from the second and the third analog repeater nodes 17(B) and 17(C) towards the first terminator node group 11(A). It will readily be understood that other frequency allocations are possible in the upper middle block.

When the terminator node groups 11 are equal in number to the predetermined number, the upper middle block should be substantially equally divided into a plurality of frequency bands, equal in number to the predetermined number. For each of the terminator node groups 11 and the analog repeater nodes 17 supplying thereto the incoming signals, the overall frequency band should accordingly be divided. It is now appreciated that the demand assign technique is very well applied in the frequency allocation to the terminator nodes 15 of the optical network in transmitting the transmission signals to the destination node or nodes.

Figure 5:
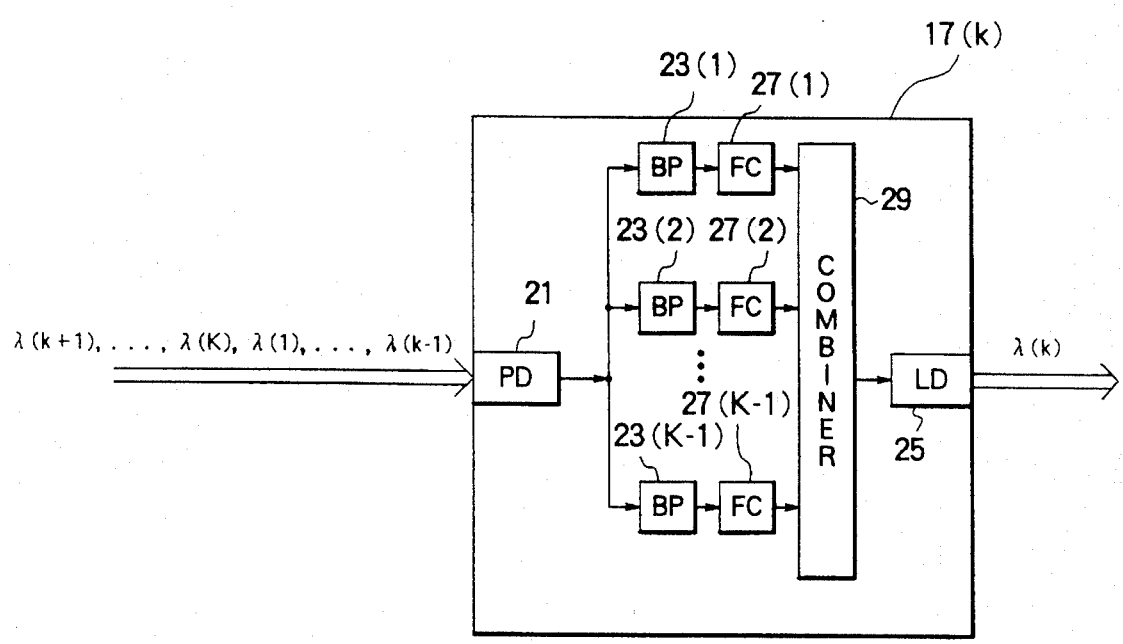
FIG. 5 is a partial block diagram of an analog repeater node unit for use in the optical network mentioned in connection with FIG. 4.

Turning to FIG. 5 with FIGS. 1 and 4 additionally referred to, a k-th analog repeater node 17(k) with the demand assign scheme comprises a send-in and send-out part and a receive-in and receive-out part which are similar in structure to each other. Similar parts are designated by like reference numerals. It is presumed that the terminator node groups 11 are first through K-th terminator node groups 11(1), . . . , and 11(K).

Each of the send-in and send-out and the receive-in and receive-out parts comprises a photodetector 21. In the send-in and send-out part and in the receive-in and receive-out part of the k-th analog repeater node 17(k) is connected to the k-th terminator node group 11(k) and to the common coupler 13, respectively. The photodetector 21 therefore receives either the k-ary outgoing signals of the (k+1)-th through the K-th and the first through the (k−1)-th optical wavelengths or the incoming signals of these optical wavelengths.

In order to deal with the demand assign scheme, the send-in or the receive-in signals are supplied to first through (K−1)-th bandpass filters (BP) 23(1), 23(2), . . . , and 23(K−1) or 23 having passbands which are, for the outgoing signals, the signal frequency bands assigned to the terminator nodes 15(k) of the k-th terminator node group 11(k) for the transmission signals directed towards the (k+1)-th through the K-th and the first through the (k−1)-th terminator node groups and, for the outcoming signals, the signal frequency bands of the transmission signals carried by the outcoming signals of the optical signals sent from the common coupler 13 with the particular wavelengths of the (k+1)-th through the K-th and the first through the (k−1)-th terminator node groups. It should be understood that the ordinal numbers of "first" through "(K−1)-th" used as modifiers of the bandpass filters 23 used not necessarily be identical with the ordinal number of "(k+1)-th" through "K-th" and "first" through "(k−1)-th" modifying the terminator node groups.

In accordance with the demand assign scheme, first through (K−1)-th frequency converters (FC) 27(1), 27(2), . . . , and 27(K−1) or 27 convert the signal frequency bands of filtered or intermediate signals supplied thereto through the first through the (K−1)-th bandpass filters 23, respectively, into converted frequency bands. For example, the narrower lowest frequency bands of the transmission signals produced by the terminator nodes 15(A) on the primary outgoing signals are frequency converted in the first analog repeater node 17(A) to the converted frequency band illustrated in the upper middle block at the lowest frequency bands. To the converted frequency bands of the broader highest frequency bands, frequency converted in the first analog repeater node 17(A) are the highest frequency band depicted in the upper middle block.

From the frequency converters 27, frequency converted signals are delivered to a combiner 29 and are frequency multiplexed into a frequency multiplexed signal for use as the send-out or the receive-out signals. In the k-th analog repeater node 17(k), the frequency multiplexed signal is fed to a light source 25 which generates an optical signal of the k-th optical wavelength. In the send-in and send-out part, the light source 25 delivers the send-out signal to the common coupler 13 as the ingoing signals. In the receive-in and receive-out part, the light source 25 delivers the receive-out signal to the k-th terminator node group 11(k) as the incoming signals.

Reviewing FIGS. 1 through 3, an optical network was manufactured by using five optical wavelengths exemplified above and three terminator node groups, each comprising four terminator nodes. It was confirmed that reuse was successful of the optical wavelengths, the signal frequency bands, and signal levels.

Reviewing FIGS. 1 through 5, it was possible with the total frequency band of 500 MHz to transmit twice as much amount of information as by the example illustrated with reference to FIGS. 1 through 3. It is possible to interconnect two of the terminator node groups directly by an analog repeater node of the type illustrated with reference to FIG. 3 or 5. It is possible to apply the demand assign scheme only to some of the terminator node groups 11 and related ones of the analog repeater nodes 17, leaving fixed frequency allocations to remaining ones of the terminator node groups 11 and of the analog repeater nodes 17.

While this invention has thus far been described in specific conjunction with only two preferred embodiments thereof and a few modifications, it will now be readily possible for one skilled in the art to put this invention in practice in various other manners. For example, it is possible to use first through M-th terminator groups 11(1) to 11(M) in the optical network assigned with K optical wavelengths, where M is less than K. It is possible to use n(m) terminator nodes in an m-th terminator group 11(m) provided that n(m) is not greater than (K−1), where m is variable between 1 and M, both inclusive. It is furthermore possible to substitute a superluminescent diode known in the art and having a wide optical spectrum linewidth for a plurality of light sources which are presumed for use in the examples described above to produce respective ones of the K optical wavelengths.

What is claimed is:

1. An optical network comprising: a plurality of terminator nodes assigned with electrical frequency bands for transmitting transmission signals on optical signals having a predetermined number of optical wavelengths;

said terminator nodes are grouped into a plurality of terminator node groups, each of said terminator node groups being assigned selected wavelengths to produce outgoing signals having said selected wavelengths among said optical signals for other of said terminator node groups, said selected wavelengths being selected from said optical wavelengths excluding one of said optical wavelengths that is specified to each of said terminator node groups as a specific wavelength;

one node group and other node groups of said terminator node groups being connected through an analog repeater node unit for receiving at least a part of the outgoing signals of said one node group as send-in signals for repeating said send-in signals as send-out signals to transmit said send-out signals as incoming signals of said optical signals to said other node groups.

2. An optical network as claimed in claim 1, wherein said terminator nodes consist of intragroup nodes in each of said terminator node groups and extragroup nodes of others of said terminator node groups, said intragroup nodes being assigned with different wavelengths, respectively, among said selected wavelengths to produce the transmission signals on said outgoing signals for transmission to said extragroup nodes and on the optical signals of said different wavelengths for transmission to said intragroup nodes.

3. An optical network as claimed in claim 2, wherein each of said destination nodes can receive the optical signals which arrive with said optical wavelengths and carry the transmission signals produced by said source nodes with said frequency bands, respectively.

4. An optical network as claimed in claim 1, wherein said terminator node groups are not greater in number of optical wavelengths than said predetermined number, the terminator nodes in each of said terminator node groups being not greater in number than said predetermined number less one.

5. An optical network as claimed in claim 4, wherein said optical wavelengths are not superposed on one another.

6. An optical network as claimed in claim 1, wherein the terminator nodes of each terminator node group are assigned with frequency bands which are not superposed on one another.

7. An optical network as claimed in claim 6, wherein said frequency bands are not varied with time.

8. An optical network as claimed in claim 6, wherein said frequency bands are varied with time.

9. An optical network as claimed in claim 8, wherein said frequency bands are varied in compliance with a demand assign scheme.

10. An optical network as claimed in claim 1, wherein the terminator nodes are connected in each of said terminator node groups to one another through an optical subnetwork.

11. An optical network as claimed in claim 10, wherein said optical subnetwork comprises a local optical coupler between each of the terminator nodes of said each of terminator node groups and others of the terminator nodes of said each of terminator node groups.

12. An optical network as claimed in claim 1, wherein said analog repeater node unit comprises a common optical coupler, a specific analog repeater node between said common optical coupler and said one node group, and other analog repeater nodes between said common optical coupler and said other node groups, respectively.

13. An optical network as claimed in claim 12, wherein each of said specific and said other analog repeater nodes interconnect said common optical coupler and each terminator node group and comprises a send-in and send-out part for receiving said outgoing signals as send-in signals, for repeating at least a part of said send-in signals as send-out signals, and for delivering said send-out signals to said common optical coupler as ingoing signals having said specific wavelength among said optical signals.

14. An optical network as claimed in claim 13, wherein said send-in and send-out part comprises a photodetector for detecting as said send-in signals the transmission signals carried on said outgoing signals, a light source responsive to said send-out signals for delivering said ingoing signals to said common optical coupler with said send-out signals on said ingoing signals, and a bandpass filter between said photodetector and said light source for filtering at least a part of said send-in signals into said send-out signals in accordance with passbands which are equal to the frequency bands assigned to the terminator nodes of said other node groups.

15. An optical network as claimed in claim 13, wherein said send-in and send-out part comprises a photodetector for detecting as said send-in signals the transmission signals carried on said outgoing signals, a light source responsive to said send-out signals for delivering said ingoing signals to said common coupler with said send-out signals carried on said ingoing signals, a plurality of bandpass filters for filtering at least a part of said send-in signals into intermediate signals in accordance with passbands equal to the frequency bands assigned to the terminator nodes of said one node group in compliance with a demand assign scheme, and frequency converters between said light source and said bandpass filters, respectively, for frequency converting said intermediate signals with said send-out signals in accordance with the frequency bands assigned in compliance with said demand assign scheme to the terminator nodes of said other node groups.

16. An optical network as claimed in claim 13, wherein each of said specific and other analog repeater nodes further comprise a receive-in and receive-out part for receiving from said common optical coupler a plurality of outcoming signals as receive-in signals, for repeating at least a part of said receive-in signals into receive-out signals, and for delivering said receive-out signals to said one group as said incoming signals having said specific wavelength, said outcoming signals being derived from the outgoing signals sent from said other node groups towards said common optical coupler.

17. An optical network as claimed in claim 16, wherein said receive-in and receive-out part comprises a photodetector for detecting as said receive-in signals the transmission signals carried on said outcoming signals, a light source responsive to said receive-out signals for delivering said incoming signals to said one node group with said receive-out signals carried on said incoming signals, and a bandpass filter for filtering at least a part of said receive-in signals into said receive-out signals in accordance with passbands which are equal to the frequency bands assigned to the terminator nodes of said one node group.

18. An optical network as claimed in claim 16, wherein said receive-in and receive-out part comprises a photodetector for detecting as said receive-in signals the transmission signals carried on said outcoming signals, a light source responsive to said receive-out signals for delivering said incoming signals to said one node group with said receive-out signals carried on said incoming signals, a plurality of bandpass filters for filtering at least a part of said receive-in signals into intermediate signals in accordance with passbands equal to the frequency bands assigned to the terminator nodes of said one node group in compliance with a demand assign scheme, and frequency converter between said light source and said bandpass filters, respectively, for frequency converting said intermediate signals altogether into said receive-out signals in accordance with the frequency bands assigned in compliance with said demand assign scheme to the terminator nodes of said one node group.

19. An analog repeater node for use in an optical network comprising: a plurality of terminator nodes assigned with electrical frequency bands for transmitting transmission signals on optical signals having a predetermined number of optical wavelengths, with said terminator nodes grouped into a plurality of terminator node groups, each of said terminator node groups being assigned with selected wavelengths to produce outgoing signals having selected wavelengths among said optical signals for others of said terminator node groups, said selected wavelengths being selected from said optical wavelengths excluding one of said optical wavelengths that is specific to each of said terminator node groups as a specific wavelength, and said analog repeater node interconnects any one node group of said terminator node groups and a common optical coupler common to other terminator node groups of said terminator node groups and is responsive to the outgoing signals of said one node group for delivering at least a part of said outgoing signals as ingoing signals to said common optical coupler.

20. An analog repeater node as claimed in claim 19, wherein said terminator node groups are not greater in number than said predetermined number of optical wavelengths, the terminator nodes in each of said terminator node groups being not greater in number than said predetermined number less one.

21. An analog repeater node as claimed in claim 19, wherein said optical wavelengths are not superposed on one another.

22. An analog repeater node as claimed in claim 19, wherein the terminator nodes of each terminator node group are assigned with frequency bands which are not superposed on one another.

23. An analog repeater node as claimed in claim 22, wherein said frequency bands are not varied with time.

24. An analog repeater node as claimed in claim 22, wherein said frequency bands are varied with time.

25. An analog repeater node as claimed in claim 19, wherein said analog repeater node comprises a send-in and send-out part for receiving said outgoing signals as send-in signals, for repeating at least a part of send-in signals as send-out signals, and for delivering said send-out signals as said ingoing signals to said common optical coupler.

26. An analog repeater node as claimed in claim 25, wherein said send-in and send-out part comprises a photodetector for detecting as said send-in signals the transmission signals carried on said outgoing signals, a light source responsive to said send-out signals for delivering said ingoing signals to said common optical coupler with said send-out signals carried on said ingoing signals, and a bandpass filter between said photodetector and said light source for filtering at least a part of said send-in signals into said send-out signals in accordance with passbands which are equal to the frequency bands assigned to the terminator nodes of said other node groups.

27. An analog repeater node as claimed in claim 25, wherein said send-in and send-out part comprises a photodetector for detecting as said send-in signals the transmission signals carried on said outgoing signals, a light source responsive to said send-out signals for delivering said ingoing signals to said common optical coupler with said send-out signals carried on said ingoing signals, a plurality of bandpass filters for filtering at least a part of said send-in signals into intermediate signals in accordance with passbands equal to the frequency bands assigned to the terminator nodes of said one node group in compliance with a demand assign scheme, and frequency converters between said light source and said bandpass filters, respectively, for frequency converting said intermediate signals altogether into said send-out signals in accordance with the frequency bands assigned in compliance with said demand assign scheme to the terminator nodes of said other node groups.

28. An analog repeater node as claimed in claim 19, wherein said analog repeater node further comprises a receive-in and receive-out part for receiving from said common optical coupler a plurality of outcoming signals as receive-in signals, for repeating at least a part of said receive-in signals into receive-out signals, and for delivering to said one node group said receive-out signals on incoming signals having said specific wavelength among said optical signals, said outgoing signals being derived from the outgoing signals sent from said other node groups towards said common optical coupler.

29. An analog repeater node as claimed in claim 28, wherein said receive-in and receive-out part comprises a photodetector for detecting as said receive-in signals the transmission signals carried on said outcoming signals, a light source responsive to said receive-out signals for delivering said incoming signals to said one node group with said receive-out signals carried on said incoming signals, and a bandpass filter for filtering at least a part of said receive-in signals altogether into said receive-out signals in accordance with passbands which are equal to the frequency bands assigned to the terminator nodes of said one node group.

30. An analog repeater node as claimed in claim 28, wherein said receive-in and receive-out part comprises a photodetector for detecting as said receive-in signals the transmission signals carried on said outcoming signals, a light source responsive to said receive-out signals for delivering said incoming signals to said one node group with said receive-out signals carried on said incoming signals, a plurality of bandpass filters for filtering at least a part of said receive-in signals into intermediate signals in accordance with passbands equal to the frequency bands assigned to the terminator nodes of said one node group in compliance with a demand assign scheme, and frequency converters between said light source and said bandpass filters, respectively, for frequency converting said intermediate signals altogether into said receive-out signals in accordance with the frequency bands assigned in compliance with said demand assign scheme to the terminator nodes of said one node group.

* * * * *